INVENTOR.
Arthur Miller

June 27, 1972   A. MILLER   3,672,746
DIGITAL LIGHT DEFLECTOR USING OPTICAL RESONATORS
Filed Jan. 14, 1970   2 Sheets-Sheet 2

INVENTOR.
Arthur Miller
BY
ATTORNEY

United States Patent Office 3,672,746
Patented June 27, 1972

3,672,746
DIGITAL LIGHT DEFLECTOR USING OPTICAL RESONATORS
Arthur Miller, Princeton Junction, N.J., assignor to RCA Corporation
Filed Jan. 14, 1970, Ser. No. 2,856
Int. Cl. G02b 27/00
U.S. Cl. 350—163    8 Claims

ABSTRACT OF THE DISCLOSURE

A light deflector is disclosed which includes an input Fabry-Perot type resonator, and an output Fabry-Perot type resonator. The two resonators are separated by a transparent wedge having an angle $\alpha/2$. A source of a laser beam of monochromatic coherent light is directed to the input resonator at an angle of incidence $\theta$ (relative to a normal reference line) at which the resonator exhibits a transmission peak, so that a beam of light is transmitted into and through the transparent wedge to the output resonator. Means are provided to vary a physical parameter in the light path through the second resonator in amounts to cause a beam of light to emerge from the output resonator at any one of many angles, relative to said reference line, approximately equal to $\theta$ plus an integral multiple including zero of $\alpha$. The parameter varied may be the phase delay in the output resonator, or a physical spacing of resonator surfaces.

BACKGROUND OF THE INVENTION

There are many applications in which means are required for deflecting a laser beam. Some applications are in the field of digital data processing, and particularly in the field of electro-optical memories utilizing holograms. Electro-optical memories requires means to deflect a laser beam in a random-access fashion to any one position in a two dimensional array having in the order of 100 by 100 resolvable positions. Known light beam deflectors include those utilizing reflection, refraction, birefringence and interference effects. Known deflectors are less than completely satisfactory as regards cost, discrete digital characteristics, input-output light efficiency, contrast ratio, and speed of operation in a random-access mode.

SUMMARY OF THE INVENTION

It is an object of the invention to provide an improved deflector which receives an incident light beam and produces an output light beam in any selected one of many discrete, equally-spaced directions. The deflectors utilizes input and output Fabry-Perot resonators and a transparent wedge therebetween. The input resonator provides a unidirectional path for conveying the incident light beam into the transparent wedge. The light beam is reflected in zig-zag fashion in the transparent wedge. The output resonator is controlled to permit any desired number of reflections in the transparent wedge, and consequently the emergence of an output beam at a corresponding desired direction.

DESCRIPTION OF THE PREFERRED EMBODIMENTS

Figure 1:
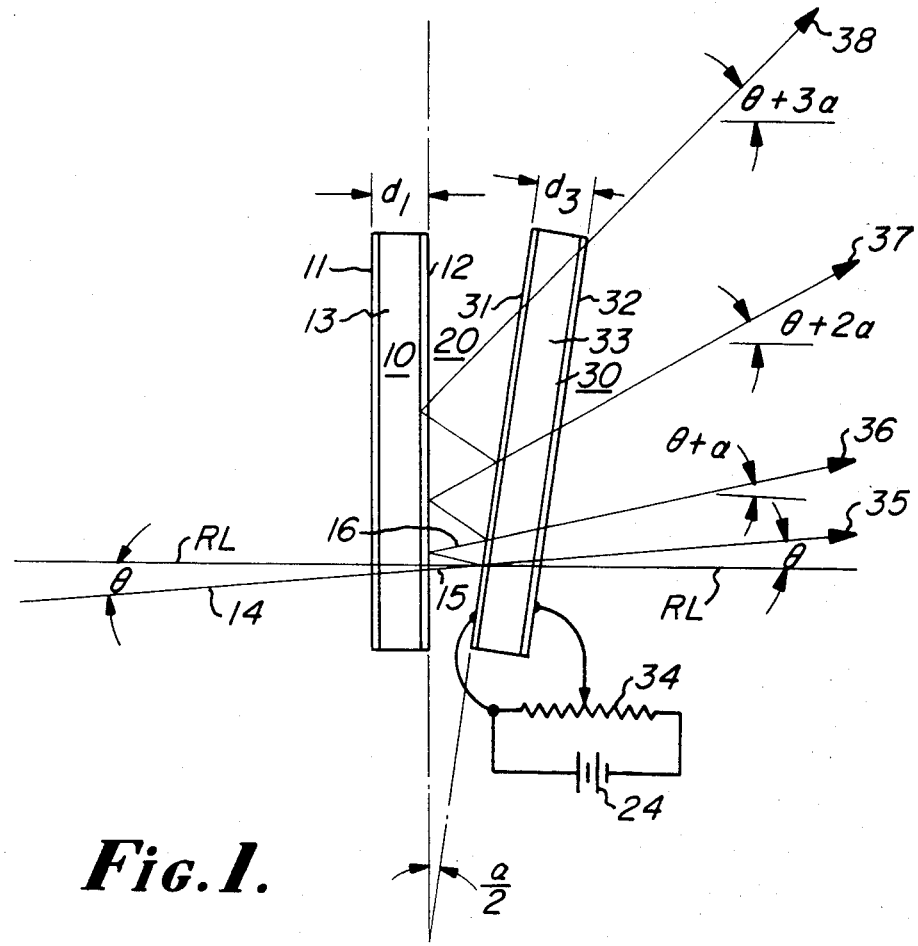
FIG. 1 is an edge-view diagram of a digital light deflector embodying the invention.

Reference is now made to FIG. 1 for a description of a digital light deflector embodying the invention. The deflector includes an input Fabry-Perot etalon or resonator 10, a transparent wedge 20 and an output Fabry-Perot resonator 30. The resonator 10 includes two partially-transparent, highly-reflective planar surfaces 11 and 12 which are perfectly parallel with each other. The surfaces 11 and 12 are shown as maintained in parallelism by a transparent plate 13 which may be of glass or quartz. The partially-transparent, highly-reflective surfaces 11 and 12 are preferably created using known multi-layer dielectric coating techniques. It is possible surfaces at which the sum of transmittance and reflectance differs from unity by about 0.001 or less, so that the optical resonator or cavity therebetween is nearly lossless.

The Fabry-Perot type resonator 10 is constructed in accordance with techniques which have been known and improved ever since the Fabry-Perot interferometer was first described in 1889. Design considerations and applications for the Fabry-Petrot resonator are described at pages 329–351 of the "Principles of Optics" by Born and Wolf, Second Edition, 1964.

Figure 2:
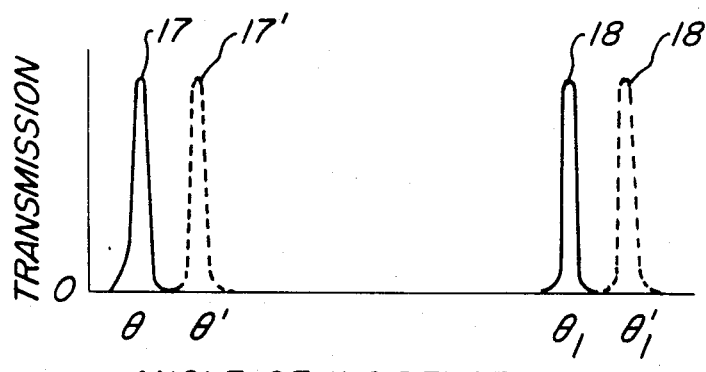
FIG. 2 is a chart of a transmission vs. angle of incidence characteristic of a Fabry-Perot type resonator employed in the deflector of FIG. 1.

The Fabry-Petrot type resonator 10 has a light-transmission characteristic as shown in FIG. 2 which depends on the angle of incidence of an incident laser beam of monochromatic coherent light. That is, when a laser beam designated 14 in FIG. 1 is directed to the resonator at an angle $\theta$ relattive to a reference line RL which is normal to planar surface 11, the resonator transmits from its surface 12 a beam 15 of light having an intensity almost as great as the intensity of the incident beam. The angle-dependent output beam 15 results from a transmission characteristic designated 17 in FIG. 2. If the angle of incidence $\theta$ of the incident beam 40 is changed a given amount to an angle $\theta_1$, the resonator will again provide an output beam as represented at 18 in FIG. 2. At angles of incidence between angles $\theta$, and $\theta_1$, the resonator 10 does not transmit the incident beam. Instead the beam is reflected. Peak transmission through the resonator occurs when the formula $2d \cos \theta = j\lambda$ is satisfied, where $d$ is the effective spacing of the reflectors and $\lambda$ is the wavelength of the light. The characteristics of the optical resonator 10 are analogous to the characteristics of an electrical microwave radio frequency resonator or cavity with respect to the coupling of ratio frequency energy to and from the resonator with changes in frequency of the radio frequency energy.

The deflector shown in FIG 1 also includes an output Fabry-Perot type resonator 30 which is similar in construction to the input resonator 10, but has means for varying the effective spacing $d_3$, and consequently the incident angle $\theta$ at which peak transmission occurs. The resonators 10 and 30 are inclined to each other by spacers (not shown) to provide a transparent wedge 20 therebetween having an apex angle $\alpha/2$. The transparent wedge 20 may be air, or may be a transparent solid material.

There re many known ways of constructing the deflector shown in FIG. 1. Whatever method is selected must be one which insures that the partially transparent and highly reflective surfaces or films 11, 12, 31 and 32 are very flat in terms of a fraction of the wavelength of the incident light beam 14. The perfect parallelism of the surfaces 11 and 12, and the surfaces 31 and 32 must also be insured. Furthermore, the stability of the angular relationship between surfaces 12 and 13 must be insured. For this latter reason, it may be preferable to construct the transparent wedge 20 as an element of solid material, rather than air, as will be described in connection with the embodiment of the invention shown in FIG. 3.

The output resonator 30 differs from the input resonator 10 in that the output resonator 30 is provided with means to vary a physical parameter of the resonator. That is, the output resonator 30 is made with means to control the angle of incidence at which it is transmissive. This can be accomplished in a number of different ways. For example, the partially transparent and highly reflective surfaces 31 and 32 may be constructed including films which are electrically conductive and which therefore provide electrodes on opposite surfaces of the plate 33. The transparent plate 33 is made of an electro-optic material characterized in having a refractive index which changes in accordance with an electrical potential applied across the material. A source of a variable potential is illustrated by a battery or source of fixed potential 24 and a potentiometer 34 which are connected across the conductive surfaces 31 and 32. By varying the potentiometer 34, the voltage applied to the plate of electro-optic material 33 is varied, to correspondingly vary the refractive index of, and phase delay in, the plate 33.

An electro-optic material 33 with a quadratic, rather than linear, effect is preferred so that the output angle will vary linearly with applied voltage. The electro-optic material 33 need not be one providing a changing birefringence, and can be an isotropic material such as glass. Varying the phase retardation in the plate 33 is analogous to varying the dimension $d_3$ separating the surfaces 31 and 32. In both instances, the "tuning" of the resonator is varied, with the result that the resonator is transmissive to incident light beams of varied angles of incidence.

The range over which the transmissive angle of incidence of output resonator 30 can be varied without ambiguity will be described with references to FIG. 2. The two spaced transmission peaks 17 and 18 in FIG. 2 inherently occur in a given resonator at angles of incidence $\theta$ and $\theta_1$, respectively, which may be separated by from less than one degree to several degrees. However, if a parameter of the resonator is changed slightly, the transmission peaks will shift a corresponding amount so that the peaks 17' and 18' occur at angles of incidence $\theta'$ and $\theta_1'$, respectively. By changing a parameter of the resonator, the transmission peak 17' can be made to occur at any angle $\theta'$, intermediate the angles $\theta$ and $\theta_1$. This range of angles of incidence may accommodate about 100 distinct, non-overlapping peak responses. When the varied peak response locations are limited to the range between $\theta$ and $\theta_1$, adjacent simultaneously-occurring peaks cannot appear within this range to produce an operational ambiguity.

Operation over the maximum range of angles of incidence without ambiguity is accomplished by varying the effective spacing between the first surface 31 and the second surface 32 of the resonator 30 within the range of plus and minus one-fourth the wavelength of the light of the laser beam.

In the operation of the deflector of FIG. 1, a coherent laser beam 14 is directed to the input resonator 10 at an angle $\theta$ to the reference line RL such that the resonator provides an output beam 15 which enters the transparent wedge 20. The beam 15 impinges on the output resonator 30 at an angle to the normal thereto equal to $$\theta + \frac{\alpha}{2}$$

if the refractions of the beam in passing through interfaces 11 and 12 are ignored. These refractions are in amounts determined by the relative refrative indices of the materials on the two sides of the interface between them. All the angles hereafter given will be approximately correct, subject to correction for refraction effects.

If the output resonator 30 is assumed to have dimensions and characteristics such that it is transmissive to an incident beam arriving at the angle of beam 15, the beam is transmitted from the resonator 30 as an output beam 35 having the angle $\theta$ relative to reference line RL. On the other hand, if the parameters of output resonator 30 are such as to reflect the incident beam 15, the beam is reflected from the surface 31 to the surface 12, from which it is again reflected along a path 16 back to the resonator 30. If the resonator 30 is transmissive to a beam having the angle of incidence of beam 16, the beam will emerge from the resonator 30 as an output beam 36 having an angle $\theta + \alpha$ relative to reference line RL. If not, the beam will continue to zig-zag in the wedge 20 until an incident angle is reached at which the resonator 30 is transmissive. It will be noted that every time there is a zig-zag reflection within the wedge 20, the beam is directed to the output resonator 30 at an increased angle of incidence. Each successive angle of incidence, and angle of each corresponding possible output beam, is greater than the preceding one by the angular amount $\alpha$. The precise geometrical paths of a beam following a zig-zag course in a wedge are described starting at page 351 in the aforementioned "Principles of Optics."

In the operation of the deflector of FIG. 1, the incident light beam 14 will emerge from the output resonator 30 along one of paths 35, 36, 37 and 38. Of course, the four output paths shown are illustrative of a much larger number, such as 100, of different spaced output paths. The particular one of the many output paths which is transmitted by the output resonator 30 depends on the parameters at a given moment of the resonator 30. By varying a selected parameter of resonator 30, such as by varying the potentiometer 34 to vary the phase delay in the resonator, it is possible to make a beam emerge along any desired one of the output beam paths. Each output beam path has an angle relative to the reference line RL as shown in the drawing.

Figure 3:
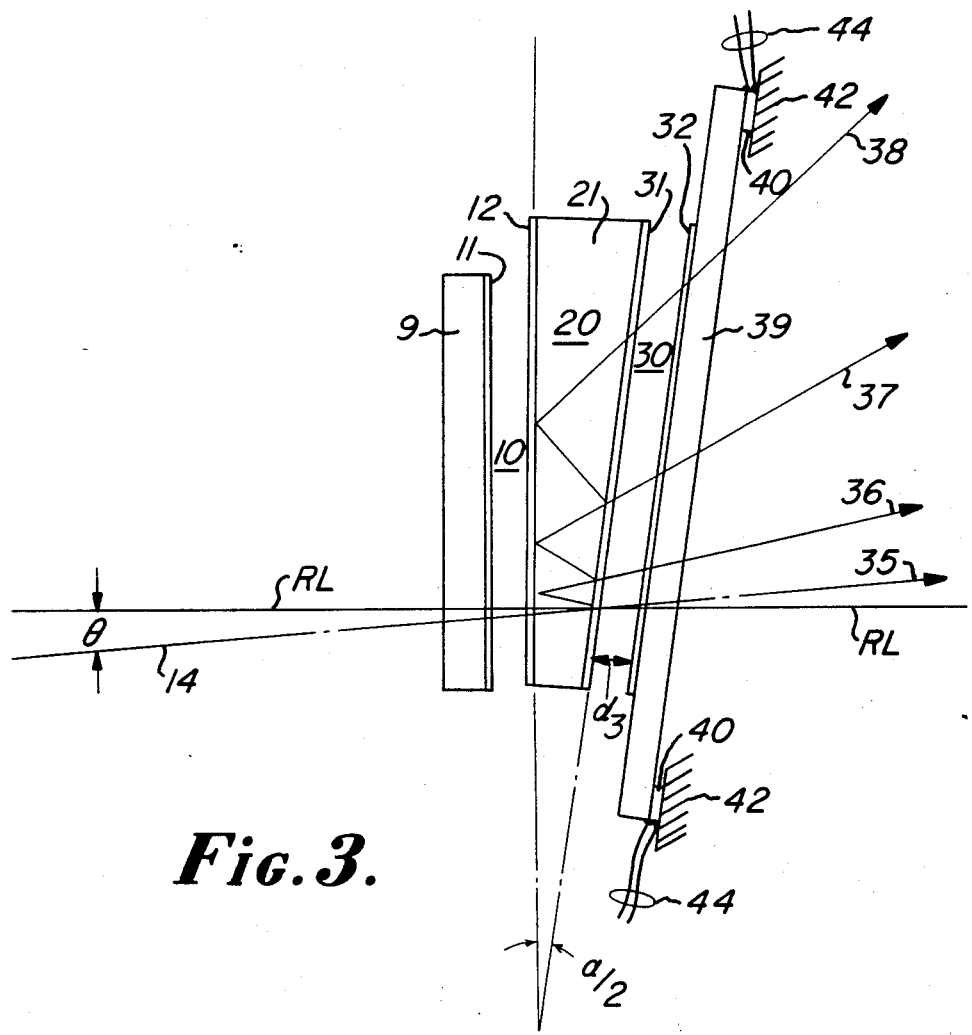
FIG. 3 is an edge-view diagram of a light deflector differing in constructional features from the one shown in FIG. 1.

FIG. 3 shows an alternative construction in which the input resonator 10 includes partially transmitting, highly reflective films 11 and 12 on facing surfaces of a solid transparent plate 9 and a solid transparent wedge 20, respectively. The interior of the resonator 10 may be an air plate having a thickness determined by spacers (not shown) between plate 9 and wedge 20. Similarly, the output resonator 30 includes partially transmitting, highly reflective films 31 and 32 on facing surfaces of wedge 20 and plate 39, respectively, with an air plate therebetween.

In the construction of FIG. 3, the output resonator 30 may be controlled by means of known electro-mechanical transducers 40 coupled to the plate 39 to effect changes in the dimension $d_3$ between films 31 and 32 of the output resonator. Transducers 40 may be piezoelectric transducers adhered between peripheral edges of plate 39 and a support 42. The transducers, or a single transducer, may be arranged in any suitable known manner which does not obstruct output beam paths 35, 36, 37 and 38. An electrical signal applied through leads 44 to the transducers controls the resonator 30 to deliver output beams along any one of paths 35, 36, 37 or 38.

Figure 4:
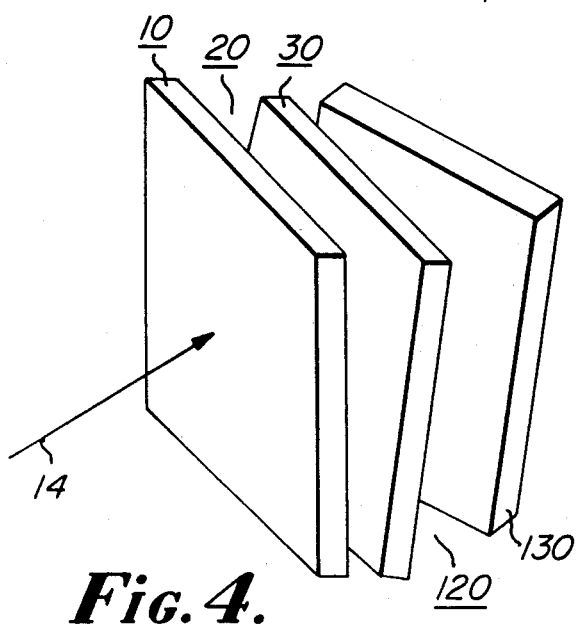
FIG. 4 is a perspective view-diagram of a light deflector providing deflection in both X and Y directions.

The deflectors of FIGS. 1 and 3 provide deflection of an incident beam in one direction, that is, to any one of many discrete positions lying within the plane of the paper on which the figures are drawn. FIG. 4 illustrates an addition to the deflector of FIG. 1 to provide deflection in both X and Y directions, so that the output beam can be directed to any location in a rectangular matrix. In FIG. 4, the input resonator 10, transparent wedge 20 and output resonator 30 are constructed the same as shown in FIG. 1. An additional output resonator 130, constructed like resonator 30, is positioned beside the resonator 30 with a transparent wedge 120 therebetween. Note that the wedge 120 is oriented differently than the wedge 20. The wedge 20 is oriented for zig-zag reflections progressing upwardly in FIG. 4, whereas the wedge 120 is oriented for zig-zag reflections progressing at right angles thereto, or to the right in the drawing.

In the operation of the X-Y deflector of FIG. 4, the incident light beam 14 results in an output beam from output resonator 30 at an output direction determined by a control voltage applied to output resonator 30. This oncedeflected beam, which is deflected in the Y direction, is incident on the second output resonator 130. The control voltage applied to the second output resonator 130 determines the amount of additional deflection in the X direction that is given to the beam when it emerges from the second output resonator 130. In this way, the output beam is deflected to any position in a rectangular X-Y matrix (not shown) which may, in one application, be a matrix of holograms.

Other methods of constructing the deflectors of the invention may be employed. For example, a deflector assembly may be built up in the form of deposited layers of different materials, each layer having the desired characteristics and dimensions. It will be understood that the dimensions and angles shown in the drawings are exaggerated for purposes of clarity of illustration and explanation.

What is claimed is:

1. A light deflector, comprising
    an input Fabry-Perot type resonator, and an output Fabry-Perot type resonator, each of said input and output resonators comprising two partially transparent and highly reflective surfaces, the two resonators being separated by a transparent wedge having an apex angle $\alpha/2$,
    a source of a beam of monochromatic light directed to said input resonator at an angle of incidence $\theta$ at which said resonator exhibits a transmission peak, whereby a beam of light is transmitted into and through said transparent wedge to said output resonator, and
    means to vary a physical parameter in the light path through said output resonator in amounts to cause a beam of light to emerge from said output resonator at any one of many angles spaced apart approximately by the angle $\alpha$.

2. A light deflector as defined in claim 1, wherein said output resonator includes a transparent material and said means to vary a physical parameter is an electro-optical means to vary the phase delay to light of the transparent material of said output resonator.

3. A light deflector as defined in claim 1, wherein said means to vary a physical parameter is a means to vary the physical thickness dimension of said output resonator.

4. A light deflector as defined in claim 3 wherein said means to vary a physical dimension is an electro-mechanical piezoelectric means.

5. A light deflector, comprising
    first, second, third and fourth spaced planar films which are partially transparent and highly reflective, the spaces between said planar films being occupied by transparent materials,
    said first and second films being parallel, said second and third films being inclined at a small angle $\alpha/2$, and said third and fourth films being parallel,
    a source of a laser beam of monochromatic light directed to said first planar film at an angle of incidence $\theta$, relative to a reference line normal to the film, at which said first and second spaced planar films exhibit a transmission peak, whereby a beam of light emerges from said second planar film and impinges on said third planar film, and
    means to vary a physical parameter in the light paths between said third and fourth planar films in amounts to cause a beam of light to emerge from said fourth planar film at any one of many angles, relative to said reference line, approximately equal to $\theta$ plus an integral multiple including zero of $\alpha$.

6. A light deflector comprising
    a Fabry-Perot type etalon having first and second spaced planar surfaces coated with partially transparent films of high reflectivity,
    a source of a laser beam of monochromatic light directed to said first planar surface of the etalon at an angle of incidence $\theta$ at which said etalon exhibits a transmission peak, whereby a beam of light emerges from said second spaced surface of said etalon.
    a Fabry-Perot type resonator having first and second spaced planar surfaces coated with partially transparent films of high reflectivity, said first surface of said resonator being positioned at an angle $\alpha/2$ with relation to said second surface of said etalon, and
    means to vary the effective spacing between the first and second surfaces of said resonator by an amount within the range of plus and minus one-fourth the wavelength of the light of said laser beam,
    whereby a beam of light can be made to emerge from said second surface of said resonator at any one of many equally-spaced angles.

7. A light deflector as defined in claim 6 wherein said means to vary said effective spacing is an electro-mechanical piezoelectric means.

8. A light deflector as defined in claim 6 wherein said resonator includes a quadratic electro-optic material between said first and second surfaces thereof and includes electric terminals thereon, and in addition, means to electrically vary the refractive index of said electro-optic material to vary the phase delay of light propagated through said material.

References Cited
UNITED STATES PATENTS

| | | | |
|---|---|---|---|
| 2,983,786 | 5/1961 | Rogers | 350—166 X |
| 3,498,693 | 3/1970 | Fein et al. | 350—166 UX |
| 3,506,334 | 4/1970 | Korpel | 350—160 |

DAVID SCHONBERG, Primary Examiner

T. H. KUSMER, Assistant Examiner

U.S. Cl. X R.

350—160, 299